J. A. DILLON.
WATER HEATER.
APPLICATION FILED DEC. 9, 1907.
907,756. Patented Dec. 29, 1908.
2 SHEETS—SHEET 1.
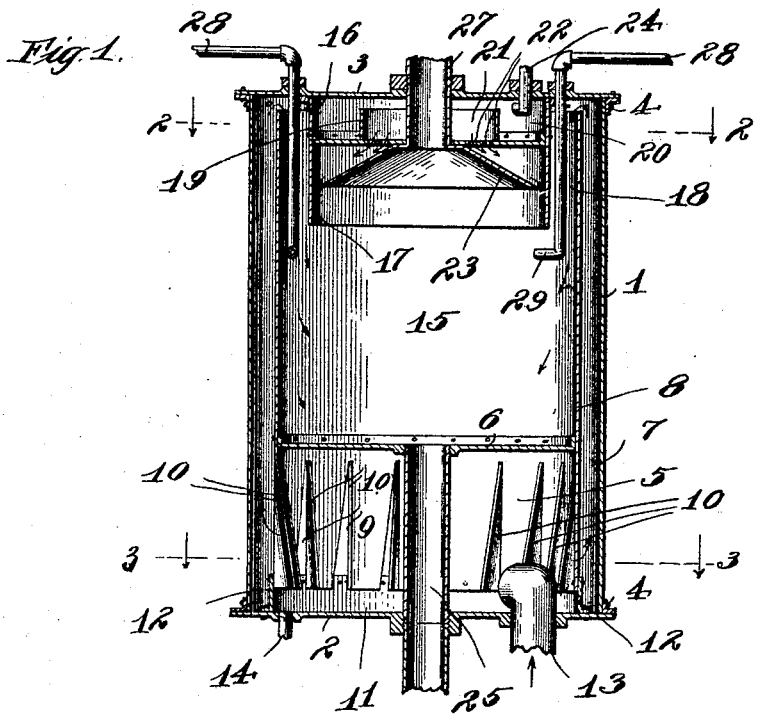
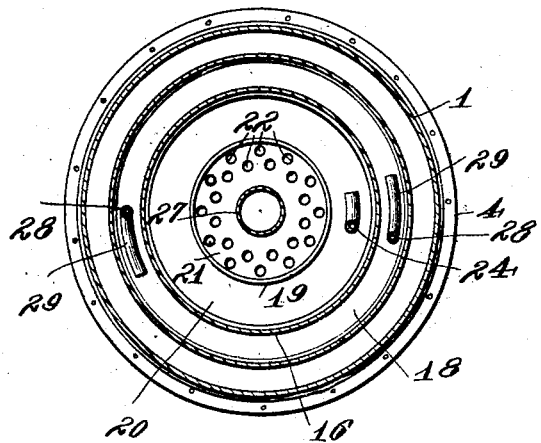
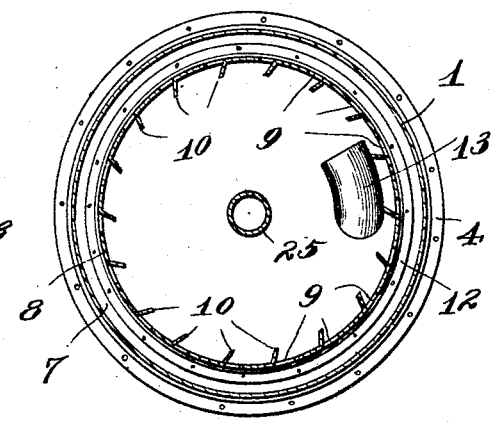
Witnesses:
Inventor.
James A. Dillon,
By Geo. E. Waldo,
Atty.

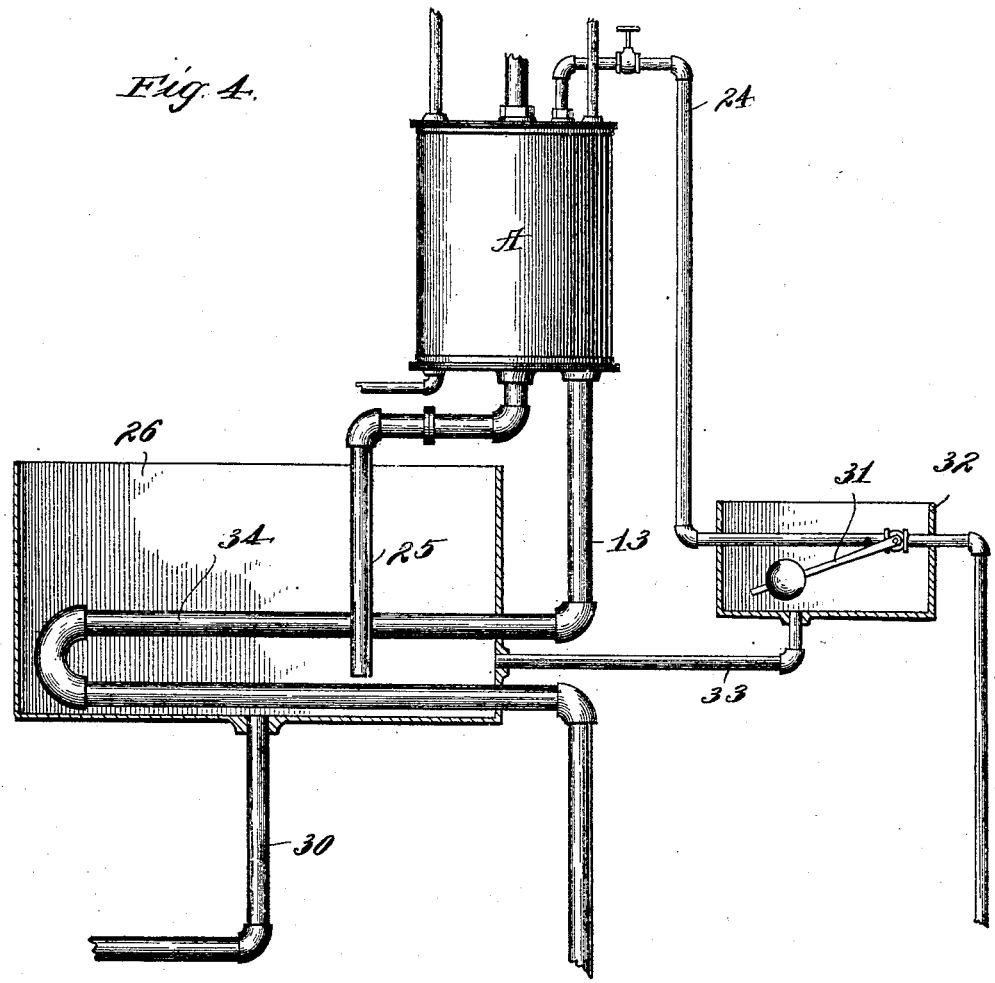

UNITED STATES PATENT OFFICE.

JAMES A. DILLON, OF CHICAGO, ILLINOIS, ASSIGNOR OF ONE-THIRD TO GEORGE LANDIS WILSON, OF CHICAGO, ILLINOIS.

WATER-HEATER.

No. 907,756.      Specification of Letters Patent.      Patented Dec. 29, 1908.

Application filed December 9, 1907. Serial No. 405,639.

*To all whom it may concern:*

Be it known that I, JAMES A. DILLON, a citizen of the United States, and a resident of Chicago, in the county of Cook and State of Illinois, have invented certain new and useful Improvements in Water-Heaters, of which the following is a specification.

This invention relates to water heaters and water heating systems, and relates particularly to such heaters and systems in which the heating of the water is effected by discharging steam directly into the water to be heated.

Primary objects of the invention, as it relates to water heaters, are, first, to provide means in a heater of this type designed for using waste or exhaust steam from engines and the like, for purifying the steam in order to render the water heated thereby available for use in laundries for washing clothes, by removing therefrom all particles of oil entrained with the steam, such as the oil used for lubricating the cylinder of the engine; and second, to provide for thoroughly associating the water to be heated with the steam, whereby all of the steam delivered to said heater will be condensed and thoroughly intermingled with the water to be heated, and all of the heat contained therein absorbed by said water, thereby securing the highest possible efficiency in said heater.

As the invention relates to an improved water system, the objects of the invention are to provide means controlled by the height of water in the hot water supply tank for automatically controlling the delivery of water to the heater, and to provide for supplementing the action of the heater by direct radiation from the steam pipe leading to the heater, and also for maintaining the hot water delivered into the hot water supply tank from said heater at a uniform temperature.

To effect these various objects, a heater and heating system of my invention comprise the various features, combinations of features and details of construction hereinafter described and claimed.

In the accompanying drawings, in which my invention is fully illustrated,—Figure 1 is a central vertical section of my improved heater. Figs. 2 and 3 are transverse sectional views thereof on the lines 2—2 and 3—3, respectively, of Fig. 1; and Fig. 4 is a side view, partly in section, of part of a heating system of my invention.

My improved heater, see particularly Figs. 1; 2 and 3, consists of a shell or casing 1, preferably made in the form of an upright cylinder, the ends of which are closed by means of heads 2 and 3, which, to provide access to the interior of the shell or casing 1 and the parts inclosed therein for purposes of cleaning, repairs, and the like, are preferably made removable. As shown, said heads are secured in position by means of bolts inserted through said heads and the flanges of angle irons 4 secured to the ends of said shell or casing.

Formed within the shell or casing 1, adjacent to its lower end, is a steam drum 5, the top of which is closed by means of a head 6. Said steam drum is smaller than the shell or casing 1, being preferably cylindrical and disposed concentric with the shell or casing 1, thus forming an annular space or passageway 7 between said drum and the outer shell or casing 1.

The space or passageway 7 is extended upwardly to within a short distance of the upper head 3 of the shell or casing 1, as shown, by extending the side walls 8 of the steam drum upwardly to within a short distance of said upper head 3. As shown, the lower head 2 of the outer shell or casing forms the lower head of the steam drum 5, said side walls 8 of said steam drum being secured directly to the lower head 2 of said outer shell or casing.

Formed in the side walls 8 of the steam drum 5, are holes or openings 9, through which said steam drum communicates with the space or passageway 7 between the outer shell or casing 1 and the steam drum 5, and formed on the interior surface of said steam drum 5 are inwardly projecting wings or flanges 10, adapted to effect separation of any entrained oil particles from the steam, in a manner hereinafter described. As shown, said openings 9 extend from points adjacent to the upper head 6 of the steam drum 5 downwardly to within a short distance of the bottom of said steam drum, preferably terminating somewhat above the lower end of said drum, thus forming what may be termed a settling space 11 at the bottom of said steam drum, into which any separate oil may settle.

In the preferable construction shown, the holes or openings 9 are triangular in shape, the apexes thereof being disposed upwardly and said holes or openings gradually increasing to a desired width at their lower ends. Preferably, also, the wings or flanges 10 are formed integral with the side walls 8 of the steam drum 5. This can be conveniently effected by slitting the lateral walls of said steam drum along the lower and one vertical side of each of the desired openings 9 and bending the severed portion inwardly, as best shown in Fig. 3. For convenience in forming the holes or openings 9, and the wings or flanges 10, I prefer to form the portion of the steam drum 5 below said holes or openings of a separate section 12, which, after said holes or openings 9 and said wings or flanges 10 have been formed, is riveted or otherwise secured to the main upper section of the walls 8 of said steam drum. With this construction it will obviously only be necessary to form slits at one vertical edge of each of the holes or openings 9, which slits may be cut out at the lower edge of the main upper section of the side walls 8 of the steam drum 5.

Steam is adapted to be admitted to the steam drum 5 through a pipe 13 which communicates with a suitable source of steam supply, as the exhaust pipe of an engine, not shown, and all oil, condensed water and other liquids which accumulate in the settling chamber 11 of the heater are adapted to escape therefrom through a waste or drain pipe 14.

The discharge end of the supply pipe 13 within the steam drum 5 is directed laterally so that the steam therefrom will pass circumferentially around the steam drum 5. With this construction, the current of steam will strike the wings or flanges 10 in succession and any oil carried thereby, striking said wings or flanges, will adhere thereto, and, running down the same by gravity, will drip into the settling space 11.

Supported within and adjacent to the upper end of the space or chamber 15, within the upwardly extending side walls 8 of the steam drum 5, being preferably connected directly to the upper head 3 of the shell or casing 1, is a water tank or reservoir 16. Said water tank or reservoir is preferably circular in cross section and smaller in diameter than the space or chamber 15 and is supported concentric with the shell or casing 1. The sides of the water tank or reservoir 16 are extended, as shown at 17, a considerable distance below the upper ends of the upwardly extended side walls 8 of the steam drum 5, thus forming a downward passage 18 between the members 8 and 17 which forms a continuation of the passageway 7 and connects the steam drum 5 with the chamber 15.

A partition 19, which, as shown, is circular and concentric with the outer walls of the water tank or reservoir 16, divides said water tank or reservoir into outer and inner compartments 20 and 21. The partition 19 is shorter than the height of the water tank or reservoir 16, so that as the water rises in the outer compartment 20, it will run over the top of said partition into the inner compartment 21. Formed in the bottom of the inner compartment 21 are perforations 22, and supported beneath said inner compartment 21 is a distributing plate 23 which extends outwardly and downwardly to within a short distance of the downwardly projecting section 17 of the water tank or reservoir 16.

Water is adapted to be delivered in the water tank or reservoir 16 from any suitable source of water supply, not shown, through a pipe or pipes 24, the discharge ends of which are directed laterally so as to produce a current of water circumferentially around the water tank or reservoir 16. The object of this construction is to effect a water distribution on all sides of the inner compartment 21 of the water tank or reservoir 16, so that, when the water in the outer compartment 20 of said tank rises above the top of the partition 19, the water will flow over all sides of said partition. As fast as the water runs into the inner compartment 21 of the water tank or reservoir 16, it escapes through the holes or perforations 22 in the bottom thereof and falls upon the inclined surface of the distributing plate 23 supported beneath the same, along which it flows by gravity and drips in a thin sheet from its outer edge. The distributing plate 23 extends outwardly beyond the holes or perforations 22 in the bottom of the inner compartment 21 of the water tank, so that the area of said plate will be greater proportionate to its diameter, at points outside of said holes or perforations than within the same. Thus, as the water from said compartment falls upon said plate and runs down the same, it will spread out and fall from the edge of said plate in a thin sheet and will present a relatively large surface to the steam entering the compartment 15 from the steam drum 5 through the passageways 7 and 18, insuring a thorough association of the steam with the water, producing practically complete condensation of all of said steam and absorption of all of the heat contained therein, by the water and resulting in the highest heating efficiency possible.

The size of the perforations 22 in the bottom of the inner compartment 21 of the water tank or reservoir 16 may be varied to meet different conditions, being preferably made larger as the quantity of solid matter carried in solution in the water to be heated, as lime, and which is liable to deposit in the form of scale and thus clog or choke small openings, thus necessitating more frequent shutting down for purposes of cleaning, increases. If desired, or necessary, my invention even contemplates leaving practically the entire bottom of the compartment 21 open.

The water delivered into the compartment 15 is adapted to escape therefrom through a discharge pipe 25 which extends downwardly, preferably at the center of said compartment, through the steam drum 5 and discharges into the hot water supply tank 26, see Fig. 4. The compartment 15 is also provided with a steam exhaust pipe 27, which extends upwardly through the water tank or reservoir 16 and out through the upper head 3 of the shell or casing 1, and through which steam entering said compartment 15 may escape when no water is being delivered through the heater.

To provide for utilizing any clean steam which may be available, as the steam used for heating the mangles and the driers in laundries, I connect said sources of clean steam directly with the chamber 15 of the heater by means of a pipe or pipes 28 which, as shown, extend downwardly through the upper head 3 of the outer shell or casing 1 and through the passageway 18 between the parts 8 and 17, the discharge ends of said pipe being turned laterally, as shown at 29, so as to create a current of steam circumferentially around the chamber 15 to insure its being thoroughly associated with the water falling into said chamber from the edges of the distributing plate 23.

I will now describe my invention as it relates to an improved heating system, particular reference being had to Fig. 4.

From the heater, indicated, as a whole, by A, hot water is discharged into the hot water tank 26 through the discharge pipe 25, said hot water tank being in turn provided with a discharge pipe 30 which leads to the washers, or elsewhere that it is desired to use the water.

The delivery of water to the heater A and the level of water in the hot water tank 26 are controlled by a float valve 31 in the water supply pipe 24, said valve being contained in a valve tank 32 through which said water supply pipe passes, which is in open communication with the hot water supply tank 26 by means of a pipe 33, the relation being such that, when the water in the hot water supply tank reaches a desired maximum level, the valve in the tank 32 will be closed by the float applied thereto, all in a familiar manner. Said float valve 31 being applied to the water supply pipe 24, closing the same will obviously cut off the delivery of water to said heater A and thus to the hot water supply tank 26, no more water being admitted thereto until the level of the water in said supply tank falls, which will again open the valve 31 and permit water to enter the heater A.

In my improved heating system, the action of the heater A is supplemented by direct radiation from a coil or loop 34 of the steam pipe 13, which extends into the hot water supply tank 26. This coil is of particular advantage in maintaining the water at a desired temperature, when the supply of hot water from the heater A is cut off.

In addition to its efficiency as a heater, a particular advantage which arises from my improved heater is that, as all steam delivered into the chamber 15 of said heater is condensed, a partial vacuum will be formed therein, which will operate to draw off the steam delivered into the steam drum 5 and to create a suction in the pipe 13, thus effectually preventing back pressuring on the engine.

I claim:—

1. A water heater comprising a shell or casing, a steam drum in the lower end thereof smaller transversely than said shell or casing, thus providing a lateral space between said shell or casing and said drum, said drum being provided with lateral openings which connect the interior thereof with said lateral space, a wall or partition which extends upwardly from said drum inside of the shell or casing of the heater and at a distance therefrom and which terminates short of the top of said shell or casing, thus forming an inner compartment above the steam drum, and a passageway connecting the lateral space outside of said steam drum with the top of said inner compartment, a water reservoir in the upper end of said shell or casing provided with perforations in its bottom, a water distributing plate supported beneath the perforations in said water reservoir, and a downwardly extending wall or partition within the inner chamber of said heater which incloses said water distributing plate, a steam supply pipe communicating with said steam drum, and a water supply pipe communicating with said water reservoir.

2. A water heater comprising a shell or casing, a steam drum in the lower end thereof smaller transversely than said shell or casing, thus providing a lateral space between said shell or casing and said drum, said drum being provided with lateral openings which connect the interior thereof with said lateral space, a wall or partition which extends upwardly from said drum inside of the shell or casing of the heater and at a distance therefrom and which terminates short of the top of said shell or casing, thus forming an inner compartment above the steam drum and a passageway connecting the lateral space outside of said steam drum with the top of said inner compartment, a water reservoir in the upper end of said shell or casing, a partition in said reservoir of less height than the depth of said reservoir and which divides said reservoir into inner and outer compartments, the bottom of said inner compartment being provided with perforations, a water distributing plate supported beneath the perforated compartment of said reservoir, a wall or partition which extends downwardly within the inner compartment of said water heater and which incloses said water distributing plate, a steam supply pipe communicating with said steam drum and a water supply pipe communicating with the outer compartment of said water reservoir, the discharge end of said water supply pipe being directed laterally to create a current of water around said reservoir.

3. A water heater comprising a shell or casing, a steam drum in the lower end thereof smaller transversely than said shell or casing, thus providing a lateral space between said shell or casing and said drum, said drum being provided with lateral openings which connect the interior thereof with said lateral space, a wall or partition which extends upwardly from said drum inside of the shell or casing of the heater and at a distance therefrom and which terminates short of the top of said shell or casing thus forming an inner compartment above the steam drum and a passageway connecting the lateral space outside of said steam drum with the top of said inner compartment, a water reservoir in the upper end of said shell or casing provided with perforations in its bottom, a water distributing plate supported beneath the perforations in said water reservoir, and a downwardly extending wall or partition within the inner chamber of said heater which incloses said water distributing plate, a steam supply pipe which communicates with said steam drum, the discharge end of which is directed laterally to create a current of steam around said steam drum, and a water supply pipe which communicates with said water reservoir.

4. A water heater comprising a shell or casing, a steam drum in the lower end thereof smaller transversely than said shell or casing, thus providing a lateral space between said shell or casing and said drum, said drum being provided with lateral openings which connect the interior thereof with said lateral space, a wall or partition which extends upwardly from said drum inside of the shell or casing of the heater and at a distance therefrom and which terminates short of the top of said shell or casing thus forming an inner compartment above the steam drum and a passageway connecting the lateral space outside of said steam drum with the top of said inner compartment, a water reservoir in the upper end of said shell or casing provided with perforations in its bottom, a water distributing plate supported beneath the perforations in said water reservoir, and a downwardly extending wall or partition within the inner chamber of said heater which incloses said water distributing plate, inwardly projecting wings or flanges on the inner surface of said steam drum, a steam supply pipe communicating with said steam drum the discharge end of which is directed laterally to create a current of steam around said steam drum, and a water supply pipe which communicates with said water reservoir.

5. A water heater comprising a shell or casing, a steam drum in the lower end thereof smaller transversely than said shell or casing, thus providing a lateral space between said shell or casing and said drum, said drum being provided with lateral openings which connect the interior thereof with said lateral space, a wall or partition which extends upwardly from said drum inside of the shell or casing of the heater and at a distance therefrom and which terminates short of the top of said shell or casing thus forming an inner compartment above the steam drum and a passageway connecting the lateral space outside of said steam drum with the top of said inner compartment, a water reservoir in the upper end of said shell or casing provided with perforations in its bottom, a water distributing plate supported beneath the perforations in said water reservoir, a downwardly extending wall or partition within the inner chamber of said heater which incloses said water distributing plate, triangular wings or flanges on the inner surface of said steam drum which project inwardly and the apexes of which are disposed upwardly, a steam supply pipe communicating with said steam drum, the discharge end of which is directed laterally to create a current of steam around said steam drum, and a water supply pipe which communicates with said water reservoir.

6. A water heater comprising a shell or casing, a steam drum in the lower end thereof smaller transversely than said shell or casing, thus providing a lateral space between said shell or casing and said drum, said drum being provided with lateral openings which terminate above the bottom thereof and which connect the interior thereof with said lateral space, a wall or partition which extends upwardly from said drum inside of the shell or casing of the heater and at a distance therefrom and which terminates short of the top of said shell or casing thus forming an inner compartment above the steam drum, and a passageway connecting the lateral space outside of said steam drum with the top of said inner compartment, a water reservoir in the upper end of said shell or casing provided with perforations in its bottom, a water distributing plate supported beneath the perforations in said water reservoir, and a downwardly extending wall or partition within the inner chamber of said heater which incloses said water distributing plate, inwardly projecting wings or flanges on the inner surface of said steam drum which extend below the lower ends of the lateral openings in said steam drum, a steam supply pipe which communicates with said steam drum the discharge end of which is directed laterally to create a current of steam around said steam drum, and a water supply pipe which communicates with said water reservoir.

7. A water heater comprising an outer shell or casing, a water reservoir in the upper end thereof, a partition in said reservoir of less height than the depth of said reservoir, and which divides said reservoir into inner and outer compartments, the bottom of said inner compartment being provided with perforations, a water distributing plate supported beneath the perforations in said reservoir, and a water supply pipe for delivering water to the outer compartment of said water reservoir, the discharge end of said pipe being directed laterally to create a current of water around said outer compartment.

8. A water heater comprising an outer shell or casing, a water reservoir in the upper end thereof provided with perforations in its bottom, a water distributing plate supported beneath the perforations in said reservoir, a wall or partition which extends downwardly outside of and to a point below said water distributing plate, so as to inclose the same, and passageways for admitting steam into the interior of said shell or casing outside of and above the lower end of said downwardly extending wall or partition.

In testimony, that I claim the foregoing as my invention, I affix my signature in presence of two subscribing witnesses, this 2d day of December, A. D. 1907.

JAMES A. DILLON.

Witnesses:
   K. A. COSTELLO,
   M. V. McGRATH.